(12) United States Patent
Kakishita

(10) Patent No.: US 8,943,923 B2
(45) Date of Patent: Feb. 3, 2015

(54) STEERING SYSTEM

(71) Applicant: Jtekt Corporation, Osaka-shi, Osaka (JP)

(72) Inventor: Hideyuki Kakishita, Tokai (JP)

(73) Assignee: Jtekt Corporation, Osaka-Shi (JP)

( * ) Notice: Subject to any disclaimer, the term of this patent is extended or adjusted under 35 U.S.C. 154(b) by 0 days.

(21) Appl. No.: 14/085,088

(22) Filed: Nov. 20, 2013

(65) Prior Publication Data

US 2014/0144277 A1 May 29, 2014

(30) Foreign Application Priority Data

Nov. 28, 2012 (JP) .................................. 2012-260174

(51) Int. Cl.
*B62D 1/184* (2006.01)
*F16B 7/14* (2006.01)
*B62D 1/187* (2006.01)

(52) U.S. Cl.
CPC .............. *B62D 1/184* (2013.01); *F16B 7/1427* (2013.01); *B62D 1/187* (2013.01)
USPC ............................................ 74/493; 280/775

(58) Field of Classification Search
CPC ........ B62D 1/184; B62D 1/185; B62D 1/187; F16B 7/10; F16B 7/1427
USPC .......................................... 74/493; 280/775
See application file for complete search history.

(56) References Cited

U.S. PATENT DOCUMENTS

| | | | | |
|---|---|---|---|---|
| 4,530,254 A | * | 7/1985 | Toyoda et al. .................. | 74/493 |
| 5,813,289 A | * | 9/1998 | Renick et al. .................. | 74/493 |
| 6,952,979 B2 | * | 10/2005 | Cartwright et al. ............. | 74/493 |
| 2009/0107283 A1 | | 4/2009 | Uesaka | |
| 2009/0114055 A1 | * | 5/2009 | Stroud ............................ | 74/493 |
| 2009/0241721 A1 | * | 10/2009 | Inoue et al. ..................... | 74/493 |
| 2012/0198956 A1 | * | 8/2012 | Takezawa et al. .............. | 74/493 |
| 2012/0312117 A1 | * | 12/2012 | Maniwa .......................... | 74/493 |
| 2013/0298719 A1 | * | 11/2013 | Schnitzer et al. ............... | 74/493 |
| 2013/0319163 A1 | * | 12/2013 | Davies et al. ................... | 74/493 |
| 2014/0137693 A1 | * | 5/2014 | Buzzard et al. ................. | 74/493 |

FOREIGN PATENT DOCUMENTS

| | | |
|---|---|---|
| EP | 2 055 612 A2 | 5/2009 |
| JP | A-2008-132819 | 6/2008 |
| JP | A-2010-030579 | 2/2010 |

OTHER PUBLICATIONS

Sep. 4, 2014 Extended European Search Report issued in European Patent Application No. 13193805.2-1755.

* cited by examiner

*Primary Examiner* — Paul N Dickson
*Assistant Examiner* — Timothy Wilhelm
(74) *Attorney, Agent, or Firm* — Oliff PLC

(57) ABSTRACT

In a steering system including a lock mechanism, at a time of locking, a first cam that is rotated together with a lock shaft generates a pressing force for pushing up an inner tube in an upward tilt direction. A second cam that is rotated together with the lock shaft presses an abutting portion of an urging member in a downward tilt direction. The abutting portion of the urging member applies a pressing reaction force in the upward tilt direction, to the second cam. The pressing reaction force serves as a force for pushing up the first cam in the upward tilt direction, through the second cam and the lock shaft.

9 Claims, 5 Drawing Sheets

STEERING SYSTEM

INCORPORATION BY REFERENCE

The disclosure of Japanese Patent Application No. 2012-260174 filed on Nov. 28, 2012 including the specification, drawings and abstract, is incorporated herein by reference in its entirety.

BACKGROUND OF THE INVENTION

1. Field of the Invention

The invention relates to a steering system.

2. Description of Related Art

There has been proposed a steering system including a telescopic mechanism constituted by an outer tube and an inner tube that are fitted to each other so as to be slidable relative to each other, wherein the steering system has a telescopic lock function of restricting relative slide movement in the telescopic mechanism, and wherein a single eccentric cam, which is rotated together with a lock shaft in accordance with the operation of an operation lever, presses an outer periphery of the inner tube through an opening formed in the outer tube so as to achieve telescopic lock. For example, refer to Japanese Patent Application Publication No. 2008-132819 (JP 2008-132819 A) and Japanese Patent Application Publication No. 2010-30579 (JP 2010-30579 A). In the steering system described in JP 2010-30579 A, a balance spring is provided for supporting the weight of a steering column at the time of unlocking, in order to assist tilt operation. One end of the balance spring is locked to a fixing bracket that is secured to a vehicle body, and an abutting portion of the balance spring abuts on a ring fitted to an outer periphery of the eccentric cam. The balance spring urges the steering column in an upward tilt direction through the eccentric cam and the lock shaft that is rotated together with the eccentric cam.

However, there is a possibility that a force for maintaining the locked condition may be weakened at the time of locking, due to variation in dimensional accuracy among individual components. In more detail, the rotation angle position of the eccentric cam varies at the time of locking, due to the variation in dimensional accuracy among individual components. Accordingly, the direction of load due to the torque for rotating the operation lever varies, and thus, a push-up force applied by the eccentric cam varies. As a result, there is a possibility that a required push-up force may not be obtained.

A plurality of rings which are to be fitted to the eccentric cam, and which have different outer diameters in multiple specifications may be prepared, and a specific one among these rings in the multiple specifications may be selected for an individual steering system so that the eccentric cam can be held at an appropriate rotation angle position, and a required push-up force, that is, a required maintaining force can be obtained. In this case, however, a component cost and an assembly cost are increased, and as a result, a manufacturing cost is increased.

SUMMARY OF THE INVENTION

An object of the invention is to provide, at a low cost, a steering system in which a sufficient lock maintaining force is ensured, in spite of variation in dimensional accuracy.

According to an aspect of the invention, there is provided a steering system including: a steering column including an outer tube and an inner tube that are fitted to each other so as to be axially slidable relative to each other, and that support a steering shaft, the steering column being tiltable around a tilt center axis; a fixing bracket including a pair of side panels opposed to each other; a movable bracket including a pair of side panels fixed to the outer tube and opposed respectively to the side panels of the fixing bracket; a lock mechanism including a lock shaft inserted through insertion holes in the side panels of the fixing bracket and insertion holes in the side panels of the movable bracket, the lock mechanism achieving locking by bringing each of the side panels of the fixing bracket into pressure contact with a corresponding one of the side panels of the movable bracket in accordance with an operation of an operation lever that is rotated together with the lock shaft; and an urging member that urges the steering column in an upward tilt direction. The lock mechanism further includes a first cam that is rotatable together with the lock shaft, and a second cam that has a cam shape different from a cam shape of the first cam, and that is rotatable together with the lock shaft. The urging member includes a locked portion locked to a fixing member, and an abutting portion that abuts on the second cam. At a time of locking by the lock mechanism, the first cam pushes up the inner tube in the upward tilt direction through an opening in the outer tube, and the urging member pushes up the second cam in the upward tilt direction.

According to the above-described aspect, at the time of locking by the lock mechanism, the first cam that is rotated together with the lock shaft generates a pressing force for pushing up the inner tube in the upward tilt direction. Further, at the time of locking by the lock mechanism, the abutting portion of the urging member applies a pressing reaction force in the upward tilt direction, to the second cam. The pressing reaction force serves as a force for pushing up the first cam in the upward tilt direction, through the second cam and the lock shaft. This pressing reaction force is superposed on the pressing force with which the first cam itself pushes up the inner tube. Thus, even if there is variation in dimension accuracy among individual components, it is possible to ensure a sufficient lock maintaining force for the inner tube. Further, since the urging force of the urging member that is originally provided for supporting the weight of the steering column at the time of unlocking is applied to the second cam so as to enhance the force for maintaining the locked condition, the structure of the steering system can be simplified and a manufacturing cost can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
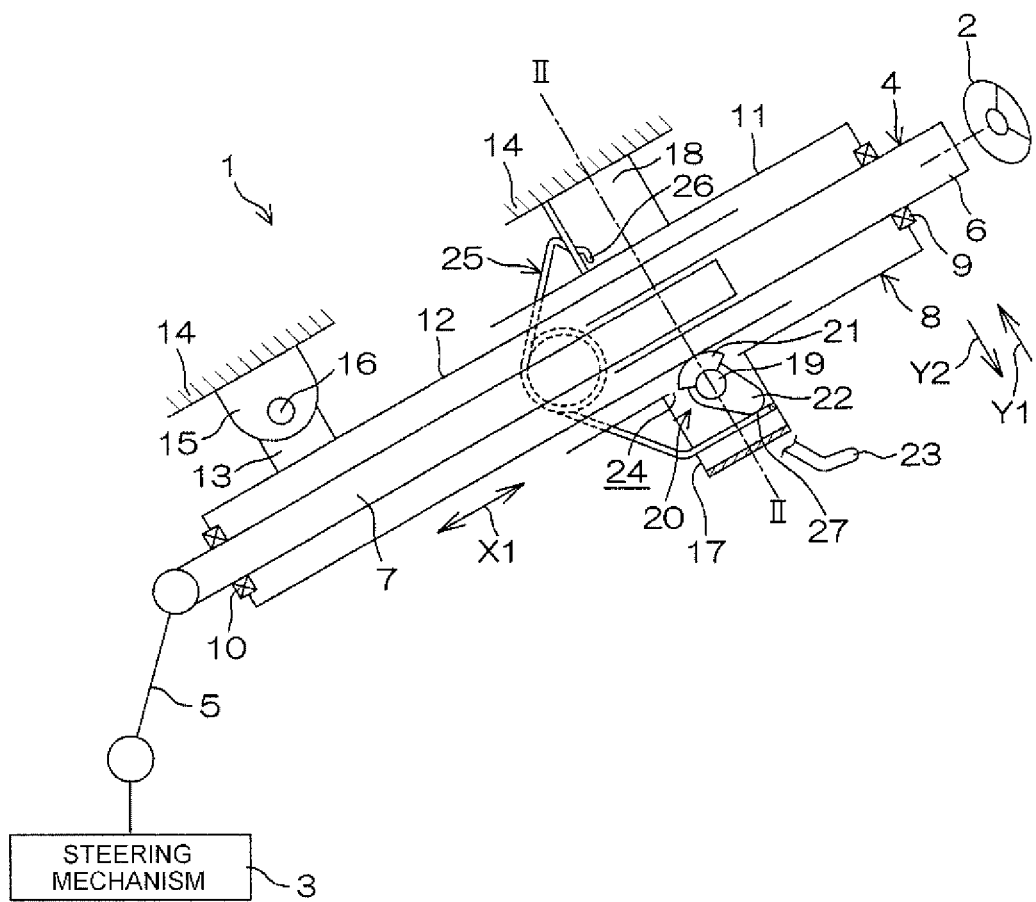
FIG. 1 is a schematic view showing a schematic configuration of a steering system according to an embodiment of the invention.

An embodiment of the present invention will be hereinafter specifically described with reference to the accompanying drawings. Referring to FIG. 1, a steering system 1 includes a steering member 2 such as a steering wheel, and a steering mechanism 3 that steers steered wheels (not shown) in accordance with a steering operation of the steering member 2. For example, a rack and pinion mechanism is used as the steering mechanism 3.

The steering member 2 is mechanically connected to the steering mechanism 3 through a steering shaft 4, an intermediate shaft 5 and the like. The rotation of the steering member 2 is transmitted to the steering mechanism 3 through the steering shaft 4 and the intermediate shaft 5 and the like. The rotation transmitted to the steering mechanism 3 is converted to axial movement of a rack shaft (not shown). Thus, the steered wheels are steered.

The steering shaft 4 includes a tubular upper shaft 6 and a tubular lower shaft 7 that are fitted to each other through spline fitting, serration fitting or the like so that the upper shaft 6 and the lower shaft 7 are slidable relative to each other. The steering shaft 4 can be extended and contracted in an axial direction X1 of the steering shaft 4. The steering member 2 is connected to an upper end portion of the upper shaft 6 in the axial direction X1. Further, the steering shaft 4 is inserted through a tubular steering column 8, and is rotatably supported by the steering column 8 through a plurality of bearings 9, 10.

The steering column 8 includes an outer tube 11 as an upper tube and an inner tube 12 as a lower tube. The outer tube 11 and the inner tube 12 are fitted to each other so as to be slidable relative to each other. The steering column 8 can be extended and contracted in the axial direction X1. The outer tube 11 supports the upper shaft 6 through the bearing 9 so that the upper shaft 6 is rotatable. The outer tube 11 is coupled to the upper shaft 6 through the bearing 9 so as to be movable in the axial direction X1 of the steering shaft 4 together with the upper shaft 6.

A lower side movable bracket 13 is secured to an outer periphery of the inner tube 12 so that the lower side movable bracket 13 is movable together with the inner tube 12. The lower side movable bracket 13 is supported by a lower side fixing bracket 15 secured to the vehicle body 14 through a tilt center shaft 16 so that the lower side movable bracket 13 is rotatable. Thus, the steering column 8 and the steering shaft 4 are rotatable (tiltable) around the tilt center shaft 16 as a fulcrum. By rotating (tilting) the steering shaft 4 and the steering column 8 around the tilt center shaft 16 as a fulcrum, adjustment of the position of the steering member 2, that is, so-called tilt adjustment can be performed. Further, by extending or contracting the steering shaft 4 and the steering column 8 in the axial direction X1, adjustment of the position of the steering member 2, that is, so-called telescopic adjustment can be performed.

An upper side movable bracket 17 that corresponds to a distance bracket is secured to the outer tube 11. The upper side movable bracket 17 is movable together with the outer tube 11. Further, an upper side fixing bracket 18 is secured to the vehicle body 14. When the movable bracket 17 and the fixing bracket 18 are locked together by a lock mechanism 20 including a lock shaft 19 that is inserted through the both brackets 17, 18, the position of the steering column 8 is fixed with respect to the vehicle body 14, and accordingly the position of the steering member 2 is fixed.

Further, the lock mechanism 20 includes a first cam 21 that is rotatable together with the lock shaft 19, and a pair of second cams 22 (only one of which is shown in FIG. 1) that are rotatable together with the lock shaft 19. Each of the second cams 22 has a cam shape that is different from a cam shape of the first cam 21. When an operation lever 23 that is rotated together with the lock shaft 19 is operated to rotate the lock shaft 19 in a locking direction that corresponds to a rotating direction at the time of locking, the first cam 21 that is rotated together with the lock shaft 19 pushes up the inner tube 12 in an upward tilt direction Y1, through an opening 24 formed in the outer tube 11, so as to press the inner tube 12 against the outer tube 11. Thus, the inner tube 12 is fixed to the outer tube 11.

The steering system 1 includes an urging member 25 that urges the steering column 8 in the upward tilt direction Y1 so as to support the weight of the steering column 8 at the time of unlocking by the lock mechanism 20. The urging member 25 includes torsion coil springs. Further, the urging member 25 includes locked portions 26 fixed to the fixing bracket 18 and abutting portions 27 that abut on the second cams 22. The urging member 25 urges the steering column 8 in the upward tilt direction Y1 through the second cams 22, the lock shaft 19 and the movable bracket 17.

When the lock shaft 19 is rotated by operating the operation lever 23, the second cams 22 that are rotated together with the lock shaft 19 press the abutting portions 27 of the urging member 25 in a downward tilt direction Y2 that is opposite to the direction of urging by the urging member 25. On the other hand, the urging member 25 applies a pressing reaction force in the upward tilt direction Y1 to the second cams 22 through the abutting portions 27. The pressing reaction force acts upon the inner tube 12 through the second cams 22, the lock shaft 19 and the first cam 21 so that the inner tube 12 is pushed up and is pressed against the outer tube 11.

Figure 2:
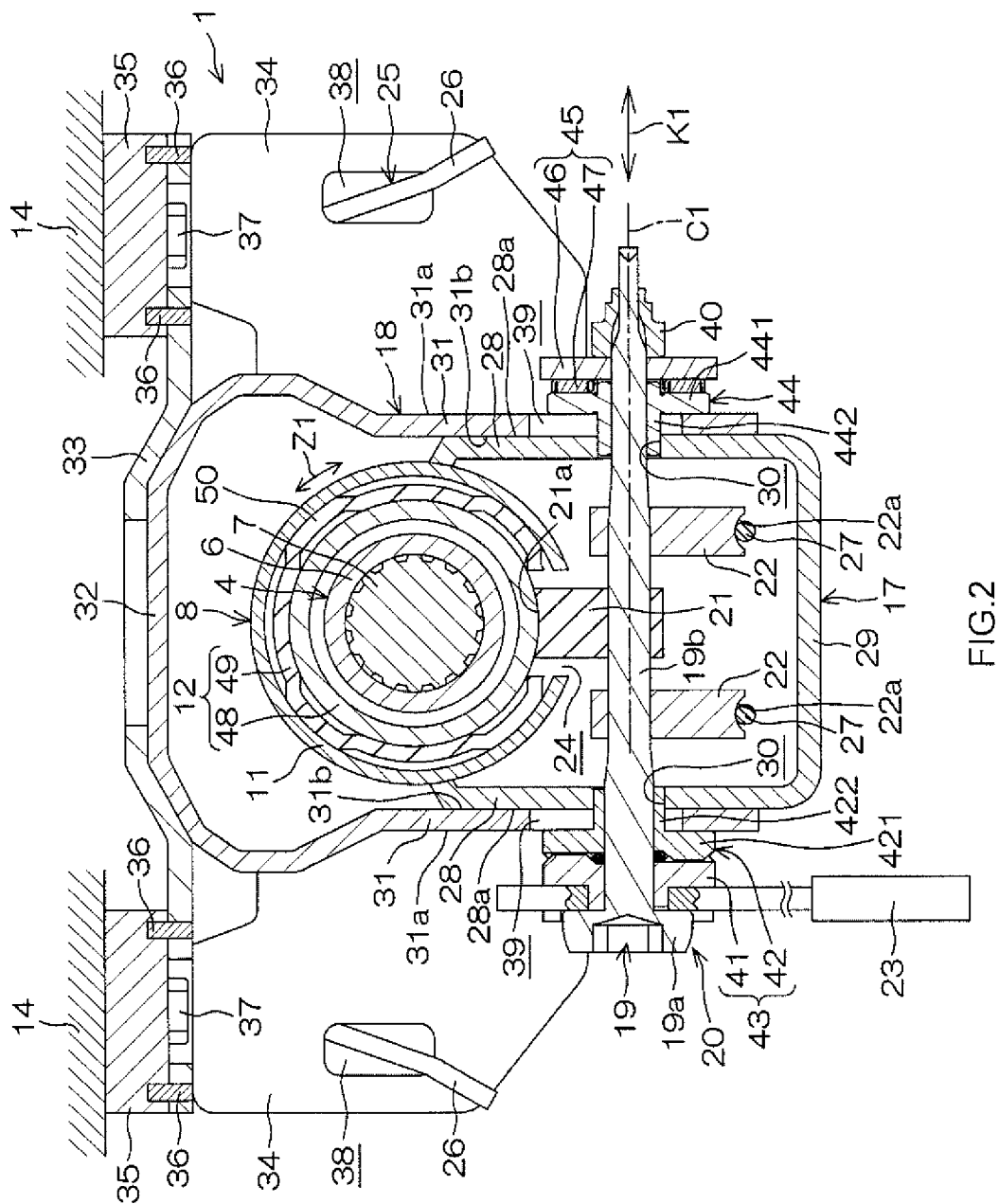
FIG. 2 is a sectional view taken along the line I-I in FIG. 1.

FIG. 2 is a sectional view taken along the line II-II in FIG. 1 for illustrating the steering system 1. Referring to FIG. 2, the movable bracket 17 is a groove-shaped member that is opened upward in FIG. 2. The movable bracket 17 has a bilaterally symmetric shape. Specifically, the movable bracket 17 includes a pair of side panels 28 opposed to each other, and a connecting panel 29 that connects respective ends of the side panels 28 (respective lower ends of the side panels 28 in FIG. 2).

A lock shaft insertion hole 30 is formed in each of the side panels 28. The lock shaft insertion hole 30 is an elongated hole for telescopic operation that extends in the axial direction X1 (direction orthogonal to the paper surface of FIG. 2). Thus, the steering shaft 4 and the steering column 8 can be extended and contracted within a range corresponding to a longitudinal length (length in the axial direction X1) of the lock shaft insertion hole 30. The respective other ends (respective upper ends in FIG. 2) of the side panels 28 are secured to an outer peripheral surface of the outer tube 11.

The fixing bracket 18 includes a pair of side panels 31 opposed to each other, a connecting panel 32 that connects respective ends (respective upper ends in FIG. 2) of the side panels 31, a plate-shaped attachment stay 33 that is secured to an upper surface of the connecting panel 32, and a pair of reinforcing extension panels 34 extending outward respectively from edge portions of the side panels 31 so as to be substantially orthogonal to the side panels 31. The side panels 31 and the connecting panel 32 define a groove-shaped portion that is opened downward in FIG. 2. The steering shaft 4, the steering column 8 and the movable bracket 17 are located between the side panels 31 of the fixing bracket 18.

The fixing bracket 18 is secured to the vehicle body 14 through a pair of attachment members 35 connected to the attachment stay 33. The attachment members 35 are connected to the attachment stay 33 by synthetic resin pins 36 that extend through the attachment stay 33 and that can be broken at the time of impact absorption. The attachment members 35 are secured to the vehicle body 14 by fixing bolts 37. Locking holes 38 are respectively formed in the extension panels 34 of the fixing bracket 18. The locking holes 38 serve as locking portions in which the locked portions 26 of the urging member 25 are hooked to be locked, respectively. An inner surface 31*b* of each of the side panels 31 of the fixing bracket 18 is opposed to an outer surface 28*a* of a corresponding one of the side panels 28 of the movable bracket 17.

Figure 3:
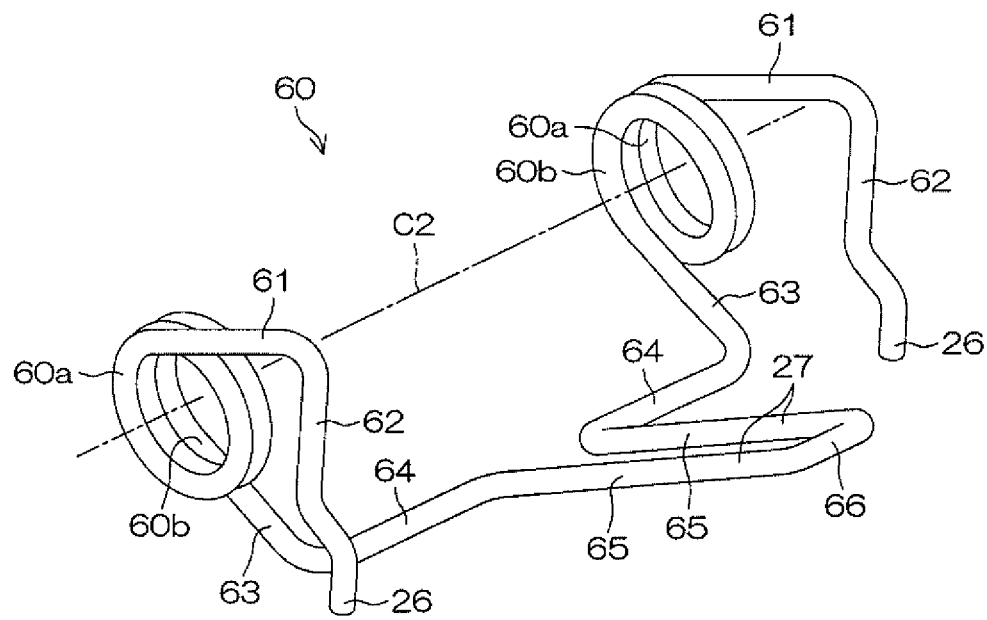
FIG. 3 is a schematic perspective view showing an urging member.

Referring to FIG. 3, the urging member 25 includes a pair of coil springs 60 symmetrically arranged, that is, the urging member 25 is formed of the so-called double torsion wire spring. The coil springs 60 have a common center axis C2. Each of the coil springs 60 has a first extension portion 61 that linearly extends from one end coil portion 60*a*, that is, an outer end coil portion of the coil spring 60, and a second extension portion 62 that extends from a distal end of the first extension portion 61 in a direction orthogonal to the first extension portion 61. The locked portion 26 to be locked in the locking hole 38 in the corresponding extension panel 34 of the fixing bracket 18 is provided at the distal end of the second extension portion 62. The locked portion 26 is formed so as to be bent into a crank shape.

Each of the coil springs 60 has a third extension portion 63 that linearly extends from the other end coil portion 60*b*, that is, an inner end coil portion, and a fourth extension portion 64 that extends inward from the third extension portion 63 toward the other of the coil springs 60. Fifth extension portions 65 as a pair of straight portions extend from opposed distal ends of the fourth extension portions 64 of the coil springs 60. The fifth extension portions 64 extend in a direction orthogonal to the fourth extension portions 64, and extend in parallel with each other. Distal ends of the fifth extension portions 65 are connected to each other through a connecting portion 66. The abutting portions 27 are respectively provided in the fifth extension portions 65 (straight portions). Each of the abutting portions 27 abuts on a corresponding one of the second cams 22.

Referring to FIG. 2, a lock shaft insertion hole 39 for tilt operation is formed in each of the side panels 31. The lock shaft insertion hole 39 is an elongated hole that extends in the upward and downward tilt directions Y1, Y2 (up-down direction in FIG. 2). The lock shaft 19 of the lock mechanism 20 is inserted through the lock shaft insertion holes 30 that are the elongated holes for telescopic operation and through the lock shaft insertion holes 39 that are the elongated holes for tilting operation. The lock mechanism 20 holds the fixing bracket 18 so that the movable bracket 17 is locked by the fixing bracket 18. In addition, the lock mechanism 20 presses the inner tube 12 so that the inner tube 12 is locked to the outer tube 11.

Specifically, the lock mechanism 20 includes the lock shaft 19 that is rotatable together with the operation lever 23; a nut 40 screwed to a thread portion formed in one end portion of the lock shaft 19; an annular cam 41 and an annular cam follower 42 that are fitted to an outer periphery of a shaft portion 19*b* of the lock shaft 19 so as to fasten the side panels 28, 31; the first cam 21 that presses the inner tube 12 in the upward tilt direction Y1; and the second cams 22 that press the abutting portions 27 of the urging member 25 in the downward tilt direction Y2.

The cam 41 and the cam follower 42 constitute a cam mechanism 43 for fastening the side panels 28, 31. A plurality of cam protrusions (which are not shown) are formed on each of opposed surfaces of the cam 41 and the cam follower 42, and the cam protrusions on the opposed surfaces are meshed with each other. The cam 41 and the cam follower 42 are arranged in the vicinity of a head portion 19*a* of the lock shaft 19. The cam 41 and the operation lever 23 are coupled with the head portion 19*a* of the lock shaft 19 so as to be rotatable together with the head portion 19*a*.

The cam follower 42 is fitted to an outer periphery of the shaft portion 19*b* of the lock shaft 19 so as to be rotatable relative to the lock shaft 19. The cam follower 42 has a first portion 421 and a second portion 422. The first portion 421 of the cam follower 42 is arranged along an outer surface 31*a* of one of the side panels 31 of the fixing bracket 18. The second portion 422 of the cam follower 42 is fitted in the lock shaft insertion hole 39 in the one of the side panels 31 of the fixing bracket 18 and the lock shaft insertion hole 30 in one of the side panels 28 of the movable bracket 17 so as to be movable in directions in which the lock shaft insertion holes 30, 39 extend. The rotation of the second portion 422 is restricted by the lock shaft insertion hole 39 since width across flats or the like are formed in a portion of the second portion 422, the portion of the second portion 422 being fitted in the elongated lock shaft insertion hole 39 in the one of the side panels 31.

A first intervening member 44 and a second intervening member 45 are interposed between the nut 40 screwed to one end portion of the lock shaft 19, and the other side panel 31 of the fixing bracket 18. The first intervening member 44 has a first portion 441 and a second portion 442. The first portion 441 of the first intervening member 44 is arranged along the outer surface 31*a* of the other side panel 31 of the fixing bracket 18. The second portion 442 of the first intervening member 44 is fitted in the lock shaft insertion hole 39 in the other side panel 31 of the fixing bracket 18 and the lock shaft insertion hole 30 in the other side panel 28 of the movable bracket 17 so as to be movable along the directions in which the lock shaft insertion hole 30 and the lock shaft insertion hole 39 extend. The rotation of the second portion 442 is restricted by the lock shaft insertion hole 39 since width across flats or the like are formed in a portion of the second portion 442, the portion of the second portion 442 being fitted in the elongated lock shaft insertion hole 39 in the other side panel 31.

The second intervening member 45 includes a thrust washer 46 interposed between the first portion 441 of the first intervening member 44 and the nut 40, and a needle roller thrust bearing 47 interposed between the thrust washer 46 and the first portion 441 of the first intervening member 44. The nut 40 is smoothly rotated together with the lock shaft 19 due to the function of the second intervening member 45 including the needle roller thrust bearing 47.

When the lock shaft 19 is rotated by the rotating operation of the operation lever 23, the cam 41 moves the cam follower 42 toward the one of the side panels 31 of the fixing bracket 18. Thus, the first portion 421 of the cam follower 42 and the second portion 442 of the first intervening member 44 hold the side panels 31 of the fixing bracket 18 from outside the side panels 31 so as to bring each of the side panels 31 of the fixing bracket 18 into pressure contact with a corresponding one of the side panels 28 of the movable bracket 17. Accordingly, the movable bracket 17 is locked by the cam follower 42 and the first intervening member 44 in cooperation with the fixing bracket 18.

The inner tube 12 includes a metal tube 48 and a resin tube 49 fitted to an outer periphery of the metal tube 48. A plurality of protruding portions 50 are formed at the resin tube 49 such that the protruding portions 50 are spaced from each other in a circumferential direction Z1 of the resin tube 49. Further, the protruding portions 50 are formed at plural positions that are spaced from each other in the axial direction of the resin tube 49, though not shown in the figure. The resin tube 49 may be eliminated, and the protruding portions 50 may be formed at the outer periphery of the metal tube 48.

Figure 4:
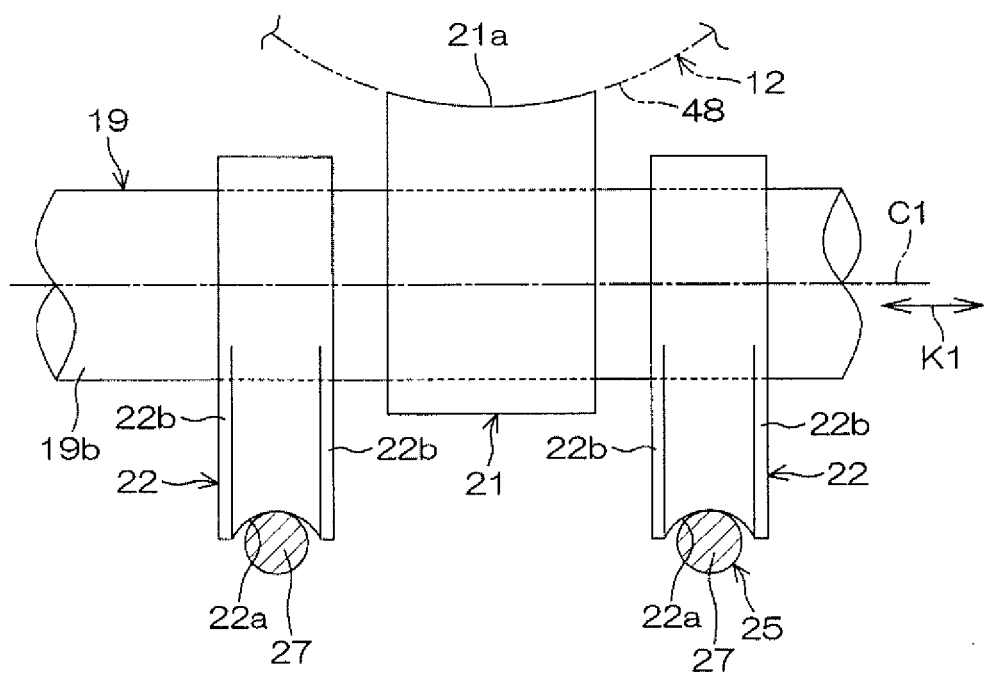
FIG. 4 is an enlarged view of a main portion of a lock mechanism, the enlarged view partly showing a lock shaft, a first cam, and second cams.
Figure 5:
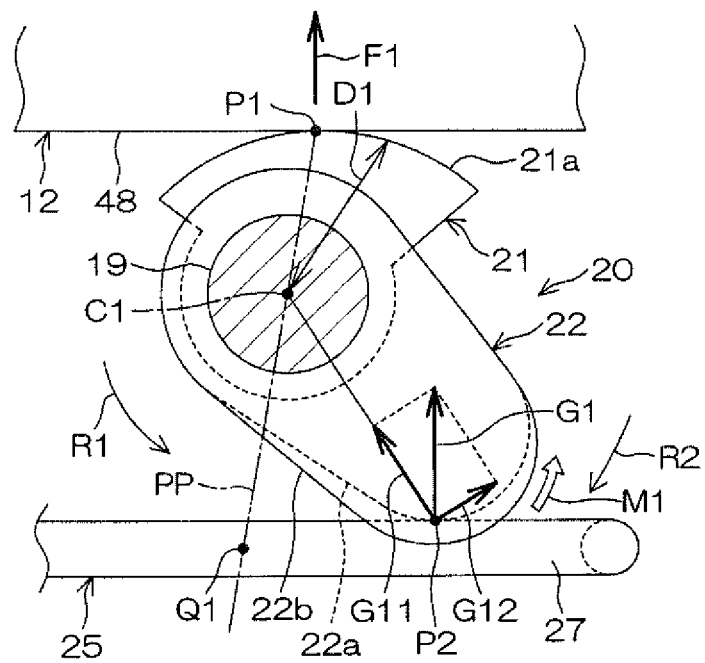
FIG. 5 is a schematic view showing a main portion of the lock mechanism as viewed in an axial direction of the lock shaft.

As shown in FIG. 2 and FIG. 4 that is an enlarged view, the first cam 21 is an annular member that is fitted to and secured to the outer periphery of the shaft portion 19b of the lock shaft 19 at a substantially center portion of the shaft portion 19b so as to be rotatable together with the lock shaft 19. As shown in FIG. 2, a portion of the first cam 21 enters the outer tube 11 through an opening 24 formed in the outer tube 11. As shown in FIG. 5, a cam surface 21a that is a portion of an outer periphery of the first cam 21 has such an arc cam shape that a distance D1 from the center axis C1 of the lock shaft 19 to the cam surface 21a is continuously changed, with respect to rotating directions R1, R2 of the lock shaft 19. The cam shape of the cam surface 21a is such that the distance D1 from a first contact point P1, at which the cam surface 21a contacts the metal tube 48 of the inner tube 12, to the center axis C1 is continuously increased as the lock shaft 19 is rotated in the rotating direction R1 at the time of locking (corresponding to the locking direction). Accordingly, when the lock shaft 19 is rotated in the rotating direction R1 at the time of locking, a pressing force F1, with which the cam surface 21a pushes up the metal tube 48 of the inner tube 12, is generated.

The center (not shown) of the arc of the cam shape is located offset from the center axis C1 of the lock shaft 19. Accordingly, the first cam 21 can be referred to as "eccentric cam" as long as the cam shape of the first cam 21 is an arc cam shape. When the cam shape of the first cam 21 is the arc cam shape, the first cam 21 has an advantage that the first cam 21 can be easily produced. However, the cam shape need not necessarily be the arc cam shape in the present invention, if the distance D1 between the first contact point P1 and the center axis C1 is continuously increased as the lock shaft 19 is rotated in the rotating direction R1 at the time of locking.

As shown in FIG. 2 and FIG. 4, the cam surface 21a of the first cam 21 has a concave surface that matches the shape of an outer peripheral surface of the metal tube 48 in an axial direction K1 of the lock shaft 19. The first cam 21 comes into contact with or moves away from the outer peripheral surface of the metal tube 48 in accordance with the operation of the operation lever 23. As shown in FIG. 2 and FIG. 4, the second cams 22 are arranged on respective sides of the first cam 21 so that the first cam 21 is interposed between the second cams 22 in the axial direction K1 of the lock shaft 19. The second cams 22 have the same shape and are arranged to have the same phase as viewed in the axial direction K1 of the lock shaft 19. As shown in FIG. 5, each of the second cams 22 is an annular member that is fitted to the outer periphery of the lock shaft 19 so as to be rotatable together with the lock shaft 19, and a cam surface 22a at an outer periphery of the second cam 22 has a cam shape that is different from the cam shape of the cam surface 21a of the first cam 21, as viewed in the axial direction of the lock shaft 19 (direction orthogonal to the paper surface of FIG. 5).

As shown in FIG. 4, each of the second cams 22 has a pair of flanges 22b formed at axially opposite ends of the second cam 22 so as to circumferentially extend in at least a portion of the outer periphery of the second cam 22, and to project radially outward in order to prevent the abutting portion 27 of the urging member 25 from coming off from the cam surface 22a of the second cam 22. The cam surface 22a has a concave surface shape between the flanges 22b. At the time of locking by the lock mechanism 20 as shown in FIG. 5, a pressing reaction force G1 applied onto the second cam 22 from the abutting portion 27 of the urging member 25 generates a moment for rotating the lock shaft 19 in the rotating direction R1 at the time of locking.

Specifically, at the time of locking by the lock mechanism 20, as shown in FIG. 5, the position of a second contact point P2, at which the second cam 22 contacts the abutting portion 27 of the urging member 25, is located ahead of a crossing point Q1 at which a plane PP crosses the urging member 25, in the rotating direction R1 of the lock shaft 19 at the time of locking, as viewed in the axial direction K1 (direction orthogonal to the paper surface of FIG. 5) of the lock shaft 19, the plane PP including the center axis C1 of the lock shaft 19 and the first contact point P1 at which the cam surface 21a of the cam 21 contacts the metal tube 48 of the inner tube 12.

The pressing reaction force G1 has a first component G11 that is directed toward the center axis C1 of the lock shaft 19, and a second component G12 that is orthogonal to the first component G11. The first component G11 does not generate the moment for rotating the lock shaft 19. The second component G12 generates a moment M1 having the value that is obtained by multiplying the distance between the center axis C1 of the lock shaft 19 and the second contact point P2 by the value of the second component G12, and acting in the rotating direction R1 at the time of locking.

According to the embodiment, at the time of locking by the lock mechanism 20, the first cam 21 rotating together with the lock shaft 19 generates the pressing force F1 that pushes up the inner tube 12 in the upward tilt direction Y1. Further, at the time of locking by the lock mechanism 20, the second cams 22 rotating together with the lock shaft 19 press the abutting portions 27 of the urging member 25 in the downward tilt direction Y2 (corresponding to a direction in which the elastic repelling force of the torsion coil springs 60 in the urging member 25 is increased), and in reaction to this, the abutting portions 27 of the urging member 25 apply the pressing reaction force G1 in the upward tilt direction Y1, to the second cams 22.

The pressing reaction force G1 serves as a force for pushing up the first cam 21 in the upward tilt direction Y1 through the second cams 22 and the lock shaft 19, and this pressing reaction force G1 is superposed on the pressing force F1 with which the first cam 21 itself pushes up the inner tube 12. Thus, even if there is variation in dimension accuracy among individual components, it is possible to ensure a sufficient lock maintaining force for the inner tube 12. Since the urging force of the urging member 25 that is originally provided for supporting the weight of the steering column 8 at the time of unlocking is applied to the second cams 22 so as to enhance the force for maintaining the locked condition, the structure of the steering system can be simplified and a manufacturing cost can be reduced.

The pressing reaction force G1 from the urging member 25 generates the moment M1 for rotating the lock shaft 19 in the rotating direction R1 at the time of locking, through the second cams 22. Therefore, the lock is hardly loosened. That is, the force for maintaining the locked condition can be enhanced. Specifically, at the time of locking by the lock mechanism 20, the second contact point P2 between the second cam 22 and the urging member 25 is located ahead of the crossing point Q1 at which the plane PP crosses the urging member 25, in the rotating direction R1 of the lock shaft 19 at the time of locking, the plane PP including the first contact point P1 between the first cam 21 and the inner tube 12, and the center axis C1 of the lock shaft 19. Accordingly, the moment M1 for rotating the lock shaft 19 in the rotating direction R1 at the time of locking can be generated by the pressing reaction force G1 from the urging member 25.

Since the crossing point Q1 is separated from the second contact point P2 by a predetermined distance, the moment M1 for rotating the lock shaft 19 in the rotating direction R1 at the time of locking can be generated even if the second contact point P2 is shifted to a certain extent toward the crossing point Q1 as compared to the condition shown in FIG. 5, due to variation in dimensional accuracy. It is preferable that a plane including the center axis C1 and the second contact point P2 should extend at an angle in a range of, for example, 20 to 50 degrees with respect to the above-described plane PP.

The second cams 22 are located on respective sides of the first cam 21, abut respectively on the abutting portions 27 of the fifth extension portions 65 that are the straight portions of the urging member 25 formed by the wire spring. Since the variation in the spring characteristics of the fifth extension portions 65 that are the straight portions of the wire spring is smaller than the variation in the spring characteristics of the connecting portion 66 connecting the fifth extension portions 65, it is possible to suppress the variation in the force for maintaining the locked condition and the variation in the operating force for the operation lever 23.

Figure 6:
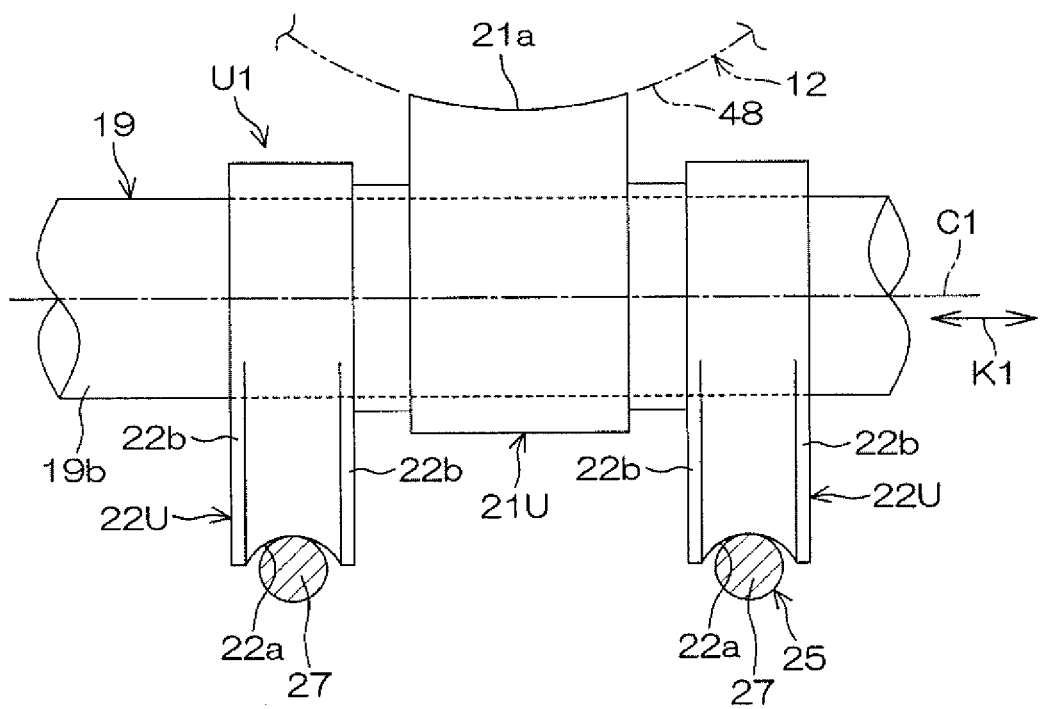
FIG. 6 is a schematic view showing a modified example of the first cam and the second cams that are formed as a single unit in another embodiment of the invention.

FIG. 6 shows another embodiment of the present invention. This embodiment is different from the embodiment shown in FIG. 4 in the following points. In the embodiment shown in FIG. 4, the first cam 21 is formed as the member that is separate from the second cams 22, and is secured to the lock shaft 19. In contrast, in this embodiment, a first cam 21U and a pair of second cams 22U constitute a cam unit U1 that is formed of a single material as an integrated body, in order to simplify the configuration. In this embodiment, the same reference numerals as in the embodiment shown in FIG. 4 are assigned to the same constituent elements as in the embodiment shown in FIG. 4.

Figure 7:
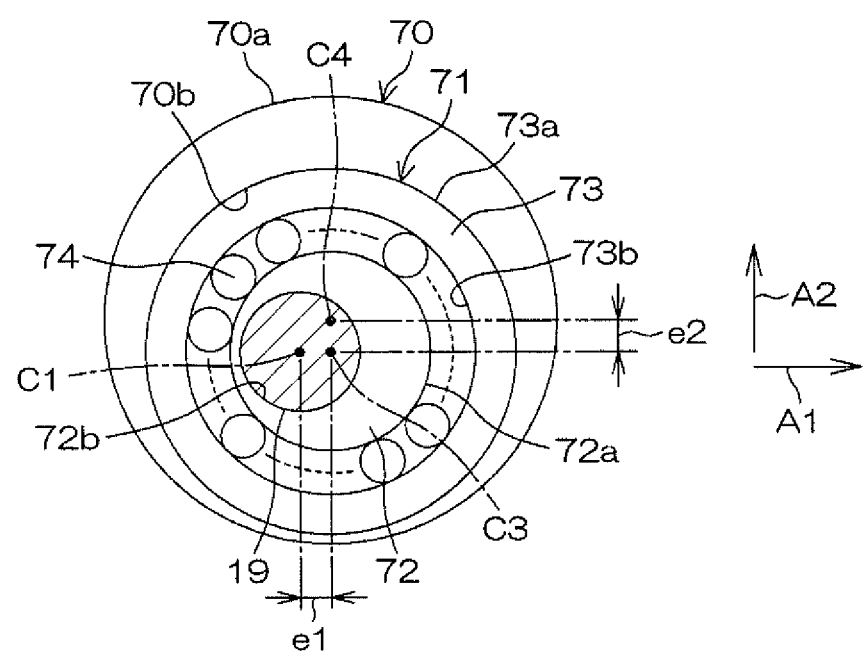
FIG. 7 is a schematic sectional view showing the second cam in a yet another embodiment of the invention.

FIG. 7 shows yet another embodiment of the present invention, in which a modified example of the second cams is used. Referring to FIG. 7, the difference between the this embodiment and the embodiment shown in FIG. 4 is that the second cams 22 are directly supported by the lock shaft 19 in the embodiment shown in FIG. 4 while annular second cams 70 are supported by bearings 71 that are held at the outer periphery of the lock shaft 19 in this embodiment.

A cam surface 70a having a circular sectional shape is formed at the outer periphery of each of the second cams 70. Each of the bearings 71 includes an inner ring 72 that is fitted to the outer periphery of the shaft portion 19b of the lock shaft 19 so as to be rotatable together with the lock shaft 19, an outer ring 73 that is fitted at an inner periphery 70b of the second cam 70 so as to be rotatable together with the second cam 70, and rolling elements 74 provided between the inner ring 72 and the outer ring 73. A first direction A1 and a second direction A2 are defined as two directions that are orthogonal to each other. A center C3 of an outer periphery 72a of the inner ring 72 is offset from the center axis C1 of the lock shaft 19 by an offset amount e1 in the first direction A1. A center C4 of a circle defined by the cam surface 70a at the outer periphery of the second cam 70 is offset from the center C3 of a circle defined by the outer periphery 72a of the inner ring 72 by an offset amount e2 in the second direction A2. The center of the inner periphery 72b of the inner ring 72 is coincident with the center axis C1 of the lock shaft 19. Both the outer periphery 73a and the inner periphery 73b of the outer ring 73 are concentric with each other.

According to this embodiment, even if the outer ring 73 fitted to the second cam 70 receives a force, the force is hardly transmitted to the inner ring 72 fitted to the outer periphery of the lock shaft 19, and accordingly, the rotating resistance of the second cam 70 can be decreased. Thus, it is possible to suppress an increase in the operating force for the operation lever 23 while enhancing the force for maintaining the locked condition. Although not shown, the second cam 70 and the outer ring 73 may be formed of a single member, as an integrated body.

The present invention is be limited to the above-described embodiments, and various modifications can be made to the above-described embodiments.

What is claimed is:

1. A steering system comprising:
   a steering column including an outer tube and an inner tube that are fitted to each other so as to be axially slidable relative to each other, and that support a steering shaft, the steering column being tiltable around a tilt center axis;
   a fixing bracket secured to a vehicle body and including a pair of side panels opposed to each other;
   a movable bracket including a pair of side panels fixed to the outer tube and opposed respectively to the side panels of the fixing bracket;
   a lock mechanism including a lock shaft inserted through insertion holes in the side panels of the fixing bracket and insertion holes in the side panels of the movable bracket, the lock mechanism locking the steering column by bringing each of the side panels of the fixing bracket into pressure contact with a corresponding one of the side panels of the movable bracket in accordance with a rotation operation of an operation lever, the operation lever being rotated with the lock shaft; and
   an urging member that urges the steering column in an upward tilt direction,
   wherein the lock mechanism further includes a first cam, which is fitted to the lock shaft so as to be rotatable with the lock shaft, and a second cam, which has a cam shape different from a cam shape of the first cam and that is fitted to the lock shaft so as to be rotatable with the lock shaft,
   wherein the urging member includes a locked portion, which is locked to the fixing bracket, and an abutting portion, which abuts on the second cam, and
   wherein, when the lock mechanism locks the steering column, the first cam pushes up the inner tube in the upward tilt direction through an opening in the outer tube and the second cam presses the urging member so that the urging member applies a pressing reaction force in the upward tilt direction to the second cam.

2. The steering system according to claim 1, wherein, when the lock mechanism locks the steering column, a position of a second contact point, at which the second cam contacts the urging member, is located ahead of a crossing point, at which a plane crosses the urging member, in a rotating direction of the lock shaft, as viewed in an axial direction of the lock shaft, the plane including a center axis of the lock shaft and a first contact point, at which the first cam contacts the inner tube.

3. The steering system according to claim 2, further comprising
   a bearing provided between the second cam and the lock shaft,
   wherein the bearing includes:
      an inner ring that is fitted to an outer periphery of the lock shaft so as to be rotatable with the lock shaft,
      an outer ring fitted to an inner periphery of the second cam, and rolling elements provided between the inner ring and outer ring, and wherein a center of an outer periphery of the inner ring is offset from a center axis of the lock shaft.

4. The steering system according to claim 2, further comprising a pair of cams that constitute the second cam and a third cam, the pair of cams are arranged on respective sides of the first cam in an axial direction of the lock shaft, wherein the urging member is a wire spring including a pair of straight portions and a connecting portion that connects respective ends of the straight portions, the straight portions extending in parallel with each other, and the abutting portion being provided in each of the straight portions, and wherein each of the second cams abuts on the abutting portion provided in a corresponding one of the straight portions of the wire spring.

5. The steering system according to claim 2, wherein the first cam and the second cam constitute a cam unit that is formed of a single member, as an integrated body.

6. The steering system according to claim 1, further comprising a pair of cams that constitutes the second cam and a third cam, the pair of cams are arranged on respective sides of the first cam in an axial direction of the lock shaft, wherein the urging member is a wire spring including a pair of straight portions and a connecting portion that connects respective ends of the straight portions, the straight portions extending in parallel with each other, and the abutting portion being provided in each of the straight portions, and wherein each of the second cams abuts on the abutting portion provided in a corresponding one of the straight portions of the wire spring.

7. The steering system according to claim 1, wherein the first cam and the second cam constitute a cam unit that is formed of a single member, as an integrated body.

8. The steering system according to claim 1, wherein, when the lock mechanism locks the steering column, the pressing reaction force generates a moment for rotating the lock shaft in a rotating direction of the lock shaft.

9. A steering system comprising:

a steering column including an outer tube and an inner tube that are fitted to each other so as to be axially slidable relative to each other, and that support a steering shaft, the steering column being tiltable around a tilt center axis;

a fixing bracket secured to a vehicle body and including a pair of side panels opposed to each other;

a movable bracket including a pair of side panels fixed to the outer tube and opposed respectively to the side panels of the fixing bracket;

a lock mechanism including a lock shaft inserted through insertion holes in the side panels of the fixing bracket and insertion holes in the side panels of the movable bracket, the lock mechanism locking the steering column by bringing each of the side panels of the fixing bracket into pressure contact with a corresponding one of the side panels of the movable bracket in accordance with a rotation operation of an operation lever, the operation lever being rotated with the lock shaft;

an urging member that urges the steering column in an upward tilt direction; and a bearing provided between the second cam and the lock shaft, wherein the lock mechanism further includes a first cam, which is fitted to the lock shaft so as to be rotatable with the lock shaft, and a second cam, which has a cam shape different from a cam shape of the first cam and that is fitted to the lock shaft so as to be rotatable with the lock shaft, wherein the urging member includes a locked portion, which is locked to the fixing bracket, and an abutting portion, which abuts on the second cam, wherein, when the lock mechanism locks the steering column, the first cam pushes up the inner tube in the upward tilt direction through an opening in the outer tube and the urging member pushes up the second cam in the upward tilt direction, wherein the bearing includes:

an inner ring that is fitted to an outer periphery of the lock shaft so as to be rotatable with the lock shaft, an outer ring fitted to an inner periphery of the second cam, and rolling elements provided between the inner ring and outer ring, and wherein a center of an outer periphery of the inner ring is offset from a center axis of the lock shaft.

\* \* \* \* \*